Sept. 15, 1964 E. DAVIES ETAL 3,149,287

SIGNAL CORRECTING CIRCUIT ARRANGEMENTS

Filed Oct. 20, 1958

INVENTORS:

Eric Davies and Anthony Norman Heightman

By: Baldwin & Wight, ATTORNEYS

United States Patent Office 3,149,287
Patented Sept. 15, 1964

3,149,287
SIGNAL CORRECTING CIRCUIT ARRANGEMENTS

Eric Davies, Danbury, and Anthony Norman Heightman, Great Baddow, England, assignors to The Marconi Company Limited, a British company
Filed Oct. 20, 1958, Ser. No. 768,148
Claims priority, application Great Britain Nov. 4, 1957
6 Claims. (Cl. 328—140)

Figure 1:
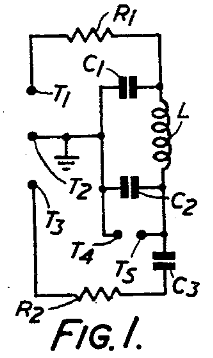

This invention relates to signal correcting circuit arrangements and has for its object to provide improved so-called aperture distortion correcting circuit arrangements suitable for use in television transmitters and television receivers.

As is well known, the finite size of the scanning beams employed in television camera tubes and in television reproducer tubes, and lens aberration in the optical systems commonly utilised in conjunction with camera tubes, cause so-called aperture distortion. This distortion manifests itself as a loss of resolution for, both in the case of a camera tube and a reproducing tube, if the scanning aperture is large enough to cover several picture elements simultaneously, there will be a loss of resolution. It is well known to seek to correct for aperture distortion by passing the video signals from a camera tube or to a reproducer tube (as the case may be) through aperture distortion correcting circuit arrangements. Known circuit arrangements for this purpose are, however, comparatively complicated and expensive and difficult to design and maintain more especially in those many cases in which the amount of aperture correction to be applied is required to be variable. Different camera and reproducing tubes may have different and sometimes varying electron beam diameters and require accordingly different amounts of aperture correction. Again there are several different television broadcasting systems with different television standards employing different scanning velocities in use in various different parts of the world and these require different amounts of aperture distortion correction. The present invention seeks to provide improved aperture distortion correcting circuit arrangements which shall be simple, economical and relatively easily designed, and which may readily be made such as to be capable of a wide range of variation of the amount of aperture distortion correction applied. If desired, indeed, the range may extend from zero correction to a very substantial amount.

According to this invention a circuit arrangement for applying aperture distortion correction to video signals includes a reactive network having two pairs of input terminals and one pair of output terminals, said network being adapted to act as a low pass filter as respects signals applied to one pair of said input terminals, and as a high pass filter as respects signals applied to the other pair of said input terminals, and means for applying the video signals to be corrected in phase opposition to the two pairs of input terminals, the network being so dimensioned that the phase relation between the output signals and the applied video signals varies substantially linearly with frequency.

Preferably the network is so dimensioned that the output amplitude (ordinates)-frequency (abscissae) response curve of the network when acting as a low pass filter begins to fall away in the vicinity of the upper frequency end of the video frequency band to be handled, and the corresponding output amplitude (ordinates)-frequency (abscissae) response curve of the network, when acting as a high pass filter, ceases to rise in the vicinity of the same frequency, so that the rising part of the latter curve is substantially wholly within the pass band of the low pass filter.

Preferably the network includes an inductance in series with a condenser in a series arm, and two shunt arm condensers one connected at each end of said inductance, and the two opposed phase inputs are applied at opposite ends of the series arm, output being taken from across the shunt arm condenser which is connected at the end of said inductance adjacent the series arm condenser.

In order to adapt a circuit arrangement in accordance with the invention, for any of a number of video signal bands of different widths (corresponding to different television standards) a plurality of differently dimensioned but otherwise similar networks may be provided together with switch means for selecting at will any of said networks for connection in the circuit.

Preferably adjustment means are provided for varying the relative strength of the two phase opposition signals. The said adjustment means may be such that at one extreme setting thereof the input to the terminals with respect to which the network acts as a high pass filter is reduced to zero. At this setting there will be zero "boost" and therefore zero aperture correction. At the other extreme setting there will be maximum "boost." Such adjustment means may comprise an adjustable potentiometer through which the input to the last mentioned terminals is applied. Alternatively the two phase opposition inputs may be derived from the outputs of two valves fed in phase opposition with the video signals, and the said adjustment means may include means for controlling the gain of that valve providing signals to the said last mentioned input terminals of the network.

Figure 3:
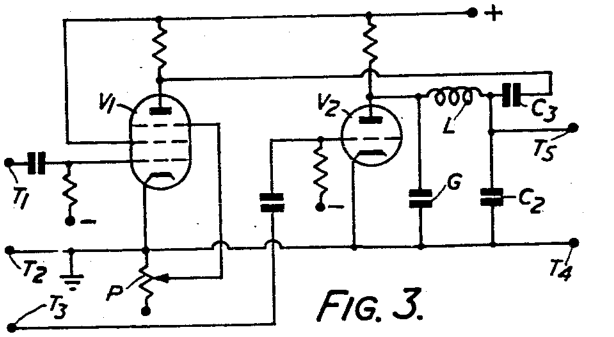
Figure 2:
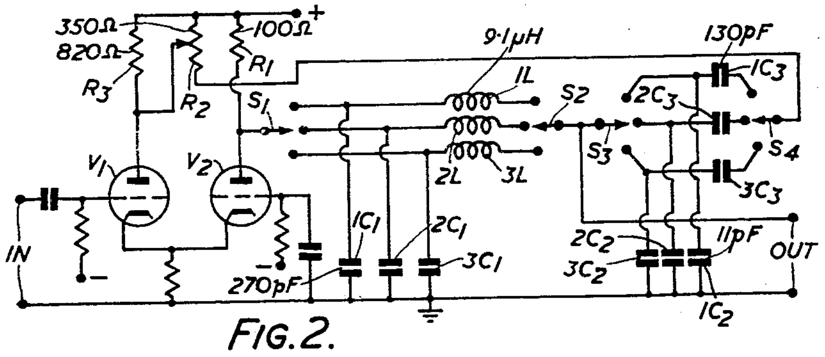
Figure 4:
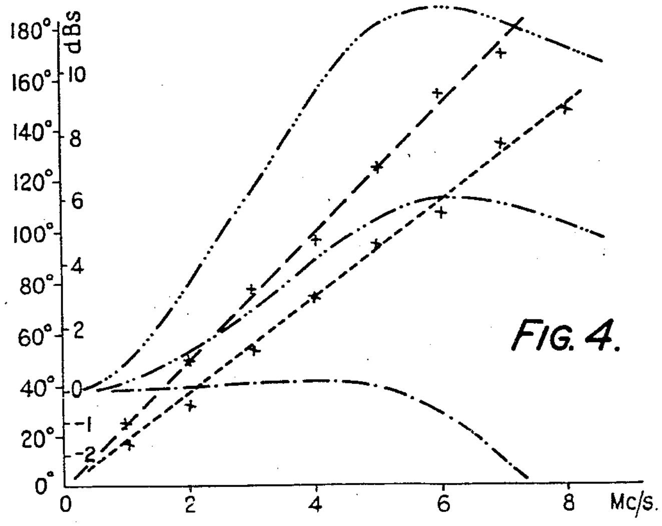

The invention is illustrated in and further explained in connection with the accompanying diagrammatic and graphical drawings in which FIGURE 1 is a highly simplified diagram of one embodiment of the invention and illustrative of the principle of the invention; FIGURE 2 shows diagrammatically an embodiment of the invention capable of a wide range of correction adjustment; FIGURE 3 shows a further modification which is very suitable for use in cases in which correction adjustment is required to be made from a remote point; and FIGURE 4 is a set of curves illustrating the performance obtainable with an embodiment of the nature of that of FIGURE 2. Like references denote like parts throughout the figures.

Referring to FIGURE 1, this shows a network consisting of a resistance $R_1$, an inductance L, a condenser $C_3$ and a resistance $R_2$ all in series between two terminals $T_1$ and $T_3$, and a pair of shunt arm condensers $C_1$, $C_2$ connected each on one side at one or other of the two opposite ends of the inductance L and at their other sides to an earthed terminal $T_2$. The terminals $T_1$, $T_2$, $T_3$ constitute two pairs of input terminals, the earthed terminal $T_2$ being common to both. Video signals to be corrected are applied in one phase between the terminals $T_1$, $T_2$ and in the opposite phase between the terminals $T_2$, $T_3$. FIGURE 1 being a highly simplified diagram, no means are shown therein for deriving the phase opposition signals for application to the two pairs of input terminals, but means for this purpose will be described with reference to FIGURES 2 or 3. Corrected video output signals are obtained from output terminals $T_4$, $T_5$ which are connected to opposite sides of the condenser $C_2$. The terminal $T_4$ is also an earthed terminal.

The network is so designed in accordance with known principles and the elements $R_1$, $C_1$, L, $C_2$, $C_3$, $R_2$ are so dimensioned in accordance with known principles that the said network functions as a low pass filter with respect to an input applied between terminals $T_1$ and $T_2$, and as a high pass filter with respect to an input applied between terminals $T_2$ and $T_3$ with the phase response of the low pass filter over the useful pass band substantially linear with respect to frequency and the phase response over the useful pass band of the high pass filter also substantially linear with frequency. The dimensioning is also such that neither filter has a sharp cut-off and the output amplitude (ordinates)-frequency (abscissae) response curve of the low pass filter begins to fall away somewhere around the upper frequency end of the video frequency band to be handled and the corresponding output amplitude (ordinates)-frequency (abscissae) response curve of the high pass filter ceases to rise at approximately the same frequency. Thus the rising part of the latter curve overlaps into the bass band of the low pass filter, which pass band constitutes approximately the useful pass band for both filters. Further, the dimensioning is such that the response of the low pass filter is substantially constant with frequency up to the point at which its response curve begins to fall away. The result of such dimensioning is that the phase opposition signals applied between terminals $T_1$ and $T_2$ and between terminals $T_2$ and $T_3$ when combined in the network will result at the terminals $T_4$ and $T_5$ in corrected signals having a linear phase-frequency characteristic, while, over the pass band of the low pass filter, the proportion of output signals due to the input between the terminals $T_2$ and $T_3$ will increase as the cut-off frequency of the low pass filter is approached. The output signals will therefore be corrected in the manner well known to be required to correct for aperture distortion. At low frequencies the contribution to the output by the input applied at terminals $T_2$ and $T_3$ will be negligible.

FIGURE 2 shows in more detail than FIGURE 1 a preferred embodiment of the invention. The actual circuit of FIGURE 2 incorporates three networks each of the general nature of that of FIGURE 1. These networks are differently dimensioned and are selectable at will by ganged switches $S_1$, $S_2$, $S_3$, $S_4$ to meet different requirements. However, in order to simplify description, the fact that there are three networks will, at first, be ignored and only one of these networks—that comprising the elements $1C_1$, 1L, $1C_2$, $1C_3$—will first be referred to, it being assumed, in this preliminary description, that the four switches are in the uppermost positions (in the drawing) so as to connect that network in circuit.

Referring now to FIGURE 2, with the foregoing preliminary assumption in mind, input video signals to be corrected are applied at terminals IN to the valves $V_1$ and $V_2$ of a cathode coupled pair of valves. Preferably, and as shown, the valve $V_1$ has an anode resistance $R_3$ in addition to the anode resistance provided by an adjustable portion of a potentiometer $R_2$. The advantage of the provision of resistance $R_3$ lies in the fact that, by virtue of its presence, the frequency of maximum boost can readily be arranged to occur, for all adjustments of the tap on resistance $R_2$, at that frequency (approximately) at which the characteristic curve of the low pass filter (see FIGURE 4 to be described later) begins to fall away. The anode circuit of valve $V_2$ includes a resistance $R_1$. The high pass-low pass filter network comprises the series inductance and capacity 1L and $1C_3$ together with two shunt arm condensers $1C_1$ and $1C_2$. Video signals in one phase are applied to one end of this network from the anode of the valve $V_2$, and video signals of the opposite phase are applied at the other end of the network from the valve $V_1$ via the potentiometer $R_2$. This potentiometer is adjustable and by varying the adjustment the amount of correction can be varied over a wide range. In one extreme position of adjustment of the potentiometer—when the tapping thereon is moved to the top of the resistance $R_2$ i.e. to the high tension line—the signal input from the anode of the valve $V_1$ to the appropriate end of the network is reduced to zero, the boost is zero, and the aperture distortion correction provided is zero. In the other extreme position of adjustment—when the tapping is at the bottom of resistance $R_2$—there is a maximum boost and maximum aperture distortion correction. Output signals are taken off from the terminals marked OUT.

FIGURE 4 shows graphically the results obtainable with a circuit arrangement as so far described with reference to FIGURE 2. In FIGURE 4 the chain line graphs connect gain in db with frequency in mc./s. for three different settings of the tap on the potentiometer resistance $R_2$. The single dotted chain line graph applies to the case when the potentiometer tap is at the top end of the resistance $R_2$, i.e. at the high tension supply line. As already explained this is the setting for zero boost and correction, and it will be observed that the curve is practically flat and horizontal up to the point at which it begins to fall away towards the abscissae line, i.e. up to about 5 mc./s. The double dotted chain line graph applies to the case when the potentiometer tap is about half way down the resistance $R_2$, i.e. there is about half boost. The treble dotted chain line graph applies to the case when the potentiometer tap is at the bottom of the resistance $R_2$ and there is maximum boost. It will be observed what a wide range of control is obtained by the operation of this single potentiometer and it may be remarked that if this potentiometer is a simple linear one, its adjustment will give substantially linear variation of control.

The remaining two graphs in FIGURE 4, namely the dash line and the dotted line, are graphs of phase (lag) in degrees plotted against frequency. The dotted line graph is for the case when the potentiometer is set to zero boost, i.e. is at the top end of the resistance $R_2$, and the dash line curve is for the other extreme setting of the potentiometer, i.e. at maximum boost. For clarity of showing, both the dash line and dotted line graphs are drawn as straight lines, but actualy observed points are indicated by crosses from which it will be seen how close an approximation to the strictly linear phase-frequency "ideal" is obtained.

By way of example, numerical values are indicated on the different elements so far described in FIGURE 2. These values of elements were used in an apparatus which gave the curves of FIGURE 4 and it was designed for the following frequency values:

Frequency of maximum amplification (in the double and treble dotted chain line graphs of FIGURE 4) =6.0 mc./s.;

Frequency at which the response as given by the single dotted chain line graph of FIGURE 4 had fallen to −1 db=6.2 mc./s.;

Frequency at which the response of the single dotted chain line graph of FIGURE 4 had fallen to −3 db =7.3 mc./s.

In connection with the value given for the condenser $1C_2$, it may be remarked that the apparatus was designed to operate connected to further apparatus (not shown) which was such as to present a stray capacity of 25 pf. between the terminals $T_4$ and $T_5$.

In order to meet different television standards, a plurality of similar networks may be provided. In FIGURE 2 there are shown three such networks selectable by switches $S_1$, $S_2$, $S_3$, $S_4$ which are gang controlled. Corresponding elements in the three networks are indicated by references which refer from one another only by an initial number indicative of the network. Thus the three series inductances in the three networks are referenced 1L, 2L and 3L respectively.

FIGURE 3 shows a modification which differs from FIGURE 2. The valves $V_1$ and $V_2$ are differently connected, and the method of adjusting the strength of signal which is fed in to the network through the condenser $C_3$ is different. In FIGURE 2 this adjustment is made by the potentiometer $R_2$, but since this potentiometer will carry video signals it cannot be conveniently situated at any substantial distance from the rest of the apparatus. In FIGURE 3 the required adjustment is obtained by means of a potentiometer P which controls the gain of the valve $V_1$, shown in FIGURE 3 as a pentode. Also the valves $V_1$ and $V_2$ are no longer cathode coupled, but receive their inputs in phase opposition from the terminals $T_1$, $T_2$ and $T_3$, the valve $V_2$ feeding in at one end of the network and the valve $V_1$ feeding in at the other. The advantage of the arrangement of FIGURE 3 is that the control potentiometer P now merely carries direct current, and it may accordingly be situated at a remote point connected to the rest of the apparatus through leads which may be of any reasonable length. In FIGURE 3 only one network is shown, but obviously a number of switch-selectable networks could be provided if required just as in FIGURE 2.

We claim:

1. A circuit arrangement for applying aperture distortion correction to video signals, said arrangement comprising a reactive network having two pairs of input terminals, means for applying the video signals to be corrected in phase opposition to the two pairs of input terminals, said network including an inductance in series with a condenser in a series arm, and two shunt arm condensers, one connected to each end of said inductance, and the two opposed phase inputs being applied at opposite ends of the series arm, output terminals connected across that shunt arm condenser which is connected at the end of said inductance adjacent the series arm condenser, the elements of the network being so dimensioned as to form a low pass filter between one pair of the input terminals and the output terminals and to form a high pass filter between the other pair of input terminals and the output terminals whereby the phase relation between the output signals and the applied video signals varies substantially linearly with frequency.

2. A circuit arrangement for applying aperture correction to video signals, said arrangement comprising network means for combining two signals in phase opposition, said network means having two pairs of input terminals and a pair of output terminals, means for applying a video signal to said pairs of input terminals in phase opposition, said network means comprising a low pass filter connected between one pair of the input terminals and said output terminals, said network means further comprising a high pass filter connected between the other pair of input terminals and said output terminals, the network means being so dimensioned that the amplitude-frequency response curve of the low pass filter begins to fall away at the same frequency as the amplitude-frequency response curve of the high pass filter ceases to rise, so that the rising part of the latter response curve is substantially wholly within the pass band of the low pass filter, whereby the phase relation between the output signals at said output terminals and the signals applied to said pairs of input terminal varies substantially linearly with frequency.

3. A circuit arrangement according to claim 2 further including adjustment means connected between said pairs of input terminals and said pair of output terminals for varying the strength of one of the two phase opposition signals.

4. An arrangement as claimed in claim 3 wherein the adjustment means are such that at one extreme setting thereof the input to the terminals with respect to which the network means acts as a high pass filter is reduced to zero.

5. An arrangement as claimed in claim 3, wherein said means for applying video signals to said input terminals comprises two valves fed in phase opposition with the video signals and the outputs of which valves provide said two phase opposition inputs, the adjustment means including means for controlling the gain of that valve providing signals to the input terminals with respent to which the network means acts as a high pass filter.

6. An arrangement as claimed in claim 1 and wherein there are a plurality of differently dimensioned reactive networks, each having two pairs of input terminals and one pair of output terminals, each network being adapted to act as a low pass filter as respects signals applied to one pair of said input terminals and to act as a high pass filter as respects signals applied to the other pair of said input terminals, and wherein switch means are provided for selecting at will any of said networks for application of video signals thereto.

References Cited in the file of this patent

UNITED STATES PATENTS

| | | |
|---|---|---|
| 2,138,341 | Crosby | Nov. 29, 1938 |
| 2,171,536 | Bingley | Sept. 5, 1939 |
| 2,378,819 | Albright | June 19, 1945 |
| 2,534,627 | Schade | Dec. 19, 1950 |
| 2,589,133 | Purington | Mar. 11, 1952 |
| 2,694,142 | Laidig | Nov. 9, 1954 |
| 2,745,907 | Guttwein et al. | May 15, 1956 |
| 3,054,064 | Sherman | Sept. 11, 1962 |